US008060750B2

(12) United States Patent
Duane et al.

(10) Patent No.: US 8,060,750 B2
(45) Date of Patent: Nov. 15, 2011

(54) SECURE SEED PROVISIONING

(75) Inventors: William M. Duane, Westford, MA (US);
Eric A. Silva, Somerville, MA (US);
Marco Ciaffi, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 1152 days.

(21) Appl. No.: 11/824,434

(22) Filed: Jun. 29, 2007

(65) Prior Publication Data

US 2009/0006858 A1    Jan. 1, 2009

(51) Int. Cl.
*G06F 21/00* (2006.01)

(52) U.S. Cl. .......... 713/182; 380/262; 380/44; 713/172; 713/159; 726/6; 726/7; 726/9; 726/20

(58) Field of Classification Search .................. 713/159, 713/172, 182, 185; 726/9, 20, 6, 7; 380/262, 380/44

See application file for complete search history.

(56) References Cited

U.S. PATENT DOCUMENTS

| 4,424,414 | A |  1/1984 | Hellman et al. |
| 4,567,600 | A |  1/1986 | Massey et al. |
| 4,606,042 | A |  8/1986 | Kahn et al. |
| 4,720,860 | A |  1/1988 | Weiss |
| 4,759,063 | A |  7/1988 | Chaum |
| 4,856,062 | A |  8/1989 | Weiss |
| 4,885,778 | A | 12/1989 | Weiss |
| 4,947,430 | A |  8/1990 | Chaum |
| 4,998,279 | A |  3/1991 | Weiss |
| 5,023,908 | A |  6/1991 | Weiss |
| 5,058,161 | A | 10/1991 | Weiss |
| 5,097,505 | A |  3/1992 | Weiss |
| 5,168,520 | A | 12/1992 | Weiss |
| 5,201,000 | A * |  4/1993 | Matyas et al. ................. 380/30 |
| 5,222,140 | A |  6/1993 | Beller et al. |
| 5,237,614 | A |  8/1993 | Weiss |
| 5,241,599 | A |  8/1993 | Bellovin et al. |

(Continued)

FOREIGN PATENT DOCUMENTS

EP    1050789    11/2000

(Continued)

OTHER PUBLICATIONS

Bellovin et al., "Encrypted Key Exchange: Password-Based Protocols Secure Against Dictionary Attacks," Proceedings of the IEEE Symposium of Research in Security and Privacy, pp. 72-84, 1992.

(Continued)

*Primary Examiner* — David Garcia Cervetti
(74) *Attorney, Agent, or Firm* — BainwoodHuang

(57) ABSTRACT

A technique is utilized in the configuration and seeding of security tokens at third party facilities, particularly at facilities of a configuration agent, such that a token can be configured without the configuration agent having security-defeating knowledge about the token. Such a technique allows a third party to provision a token with a seed, but in such a way that the third party will not know, or be able to construct, the seed after the seed provisioning process is complete. The seed may include, by way of example, a symmetric key or other secret shared by two or more entities. In some arrangements, a method is used for secure seed provisioning. Data is derived from inherent randomness in a token or other authentication device. Based on the data, the token or other authentication device is provisioned with a seed.

22 Claims, 2 Drawing Sheets

U.S. PATENT DOCUMENTS

| | | | |
|---|---|---|---|
| 5,253,295 | A | 10/1993 | Saada et al. |
| 5,351,298 | A | 9/1994 | Smith |
| 5,361,062 | A | 11/1994 | Weiss et al. |
| 5,367,572 | A | 11/1994 | Weiss |
| 5,373,558 | A | 12/1994 | Chaum |
| 5,440,635 | A | 8/1995 | Bellovin et al. |
| 5,485,519 | A | 1/1996 | Weiss |
| 5,602,918 | A | 2/1997 | Chen et al. |
| 5,657,388 | A | 8/1997 | Weiss |
| 5,724,428 | A | 3/1998 | Rivest |
| 5,745,576 | A * | 4/1998 | Abraham et al. ............... 705/73 |
| 5,835,600 | A | 11/1998 | Rivest |
| 5,841,866 | A * | 11/1998 | Bruwer et al. .................. 705/66 |
| 5,903,721 | A | 5/1999 | Sixtus |
| 5,953,420 | A | 9/1999 | Matyas et al. |
| 6,076,163 | A | 6/2000 | Hoffstein et al. |
| 6,091,819 | A | 7/2000 | Venkatesan et al. |
| 6,130,621 | A | 10/2000 | Weiss |
| 6,240,184 | B1 | 5/2001 | Huynh et al. |
| 6,269,163 | B1 | 7/2001 | Rivest et al. |
| 6,286,022 | B1 | 9/2001 | Kaliski et al. |
| 6,393,447 | B1 * | 5/2002 | Jakobsson et al. ............ 708/250 |
| 6,411,715 | B1 | 6/2002 | Liskov et al. |
| 6,681,017 | B1 | 1/2004 | Matias et al. |
| 6,681,327 | B1 | 1/2004 | Jardin |
| 6,751,729 | B1 * | 6/2004 | Giniger et al. ................ 713/153 |
| 6,813,354 | B1 | 11/2004 | Jakobsson et al. |
| 6,829,356 | B1 | 12/2004 | Ford |
| 6,985,583 | B1 * | 1/2006 | Brainard et al. ................ 380/44 |
| 7,111,172 | B1 | 9/2006 | Duane et al. |
| 7,197,639 | B1 | 3/2007 | Juels et al. |
| 7,219,368 | B2 | 5/2007 | Juels et al. |
| 7,356,696 | B1 | 4/2008 | Jakobsson et al. |
| 7,359,507 | B2 | 4/2008 | Kaliski |
| 7,363,494 | B2 | 4/2008 | Brainard et al. |
| 7,562,221 | B2 | 7/2009 | Nystrom et al. |
| 7,571,489 | B2 * | 8/2009 | Ong et al. ........................ 726/29 |
| 7,602,904 | B2 | 10/2009 | Juels et al. |
| 2002/0026345 | A1 | 2/2002 | Juels |
| 2002/0120592 | A1 | 8/2002 | Juels et al. |
| 2004/0017253 | A1 | 1/2004 | Ishigami et al. |
| 2004/0234074 | A1 * | 11/2004 | Sprunk ............................ 380/28 |
| 2005/0015588 | A1 | 1/2005 | Lin et al. |
| 2005/0091492 | A1 * | 4/2005 | Benson et al. ................ 713/170 |
| 2005/0129247 | A1 * | 6/2005 | Gammel et al. .............. 380/286 |
| 2006/0037073 | A1 | 2/2006 | Juels et al. |
| 2006/0041759 | A1 | 2/2006 | Kaliski et al. |
| 2006/0083228 | A1 * | 4/2006 | Ong et al. ...................... 370/389 |
| 2006/0177056 | A1 * | 8/2006 | Rostin et al. .................... 380/46 |
| 2006/0256961 | A1 * | 11/2006 | Brainard et al. ................ 380/44 |
| 2006/0294331 | A1 * | 12/2006 | Forrer et al. .................. 711/163 |
| 2007/0124321 | A1 | 5/2007 | Szydlo |
| 2007/0174614 | A1 * | 7/2007 | Duane et al. .................. 713/168 |
| 2010/0034383 | A1 * | 2/2010 | Turk ............................. 380/262 |

FOREIGN PATENT DOCUMENTS

| | | |
|---|---|---|
| WO | 00/48064 A1 | 8/2000 |
| WO | 2006/089101 A2 | 8/2006 |

OTHER PUBLICATIONS

Bellovin et al., "Augmented Encrypted Key Exchange: A Password-Based Protocol Secure Against Dictionary Attacks and Password File compromise," AT&T Bell Laboratories Technical Report, pp. 1-7, 1994.

Boneh et al., "On the Importance of Checking Cryptographic Protocols for Faults," (extended abstract), pp. 1-14, Jul. 26, 2001, retrieved from http://www.citeseer.nj.nec.com/boneh97importance.html.

Boneh et al., "Efficient Generation of Shared RSA Keys," pp. 1-21, Jul. 26, 2001, retrieved from http://citeseer.nj.nex.com/358268.html.

Cannetti et al., "Proactive Security: Long-Term Protection Against Break-Ins," CryptoBytes, 3:1-8, 1997.

Chaum, "Security Without Identification: Transaction Systems to Make Big Brother Obsolete," Communications of the ACM, 28: 1030-1044, 1985.

Chaum, "Blind Signatures for Untraceable Payments," Advances in Cryptology, Proceedings of the Crypto '82, Workshop on the Theory and Application of Cryptographic Techniques, Santa Barbara, CA, Aug. 23-25, 1982, New York, 1983.

Coron et al., "On the Secutiry of RSA Padding," Advances in Cryptology, Proceedings of the Crypto '99, pp. 1-18, Springer 1999.

Desmedt et al., "A Chosen Text Attack on the RSA Cryptosystem and Some Discrete Logarithm Schemes," Advances in Cryptology, Proceedings of the Crypto '85, pp. 516-522, Springer-Velag 1986.

Dierks et al., "The TLS Protocol Version 1.0," IETF RFC 2246, pp. -75, Jan. 1999, Jul. 25, 2001, retrieved from http://www.jetf.org/rfc/rfc2246.txt.

Frier et al., "The SSL 3.0 Protocol," Netscape Communications Corp., pp. 1-62; Nov. 18, 1996, retrieved Jul. 10, 2001 from http://home.netscape.come/eng/ss113/draft302.txt.

Gong, "Increasing Availability and Security of an Autherntication Service," IEEE Journal on Selected Areas in Communication, 11: 657-662, 1993.

Gong et al., "Protecting Poorly Chosen Secrets from Guessing Attacks," IEEE Journal of Selected Areas in Communications, 11: 648-656, 1993.

Gong, "Optimal Authentication Protocols Resistant to Password Guessing Attacks," Proceedings of the 8.sup.th IEEE Computer Security Foundations Workshop, Ireland, pp. 24-29, Jun. 13-15, 1995.

Halevi et al., "Public-Key Cryptography and Password Protocols," Proceedings of the Fifth ACM Conference on Computer and Communications Security, pp. 122-131, Nov. 3-5, 1998.

Heroux, "A Private Key Storage Server for DCE—Functional Specification," Open Software foundation, Request for Comments: 94.1,pp. 1-73, Nov. 1996, retrieved on Jul. 17, 2001 from http://www.opengroup.org/rfc/mirror-rfc/rfc94.1.txt.

Herzberg et al., "Proactive SEcret Sharing Or: How to Cope with Perpetual Leakage," Advances in Cryptology, Proceedings of the Crypto '95, pp. 339-352, California, Aug. 1995, Springer 1995.

Jablon, "Strong Password-Only Authenticated Key Exchange," ACM computer Communication Review, pp. 1-24, 1996.

Jabion, "Extended Password Key Exchange Protocols Immune to Dictionary Attack," Proceedings of the WETICE '97 Enterprise Security Workshop, pp. 248-255, 1997.

Juels et al., "Security of Blind Digital Signatures," Advances in Cryuptology, Proceedings of the Crypto '97, pp. 150-164, California, Aug. 1997, Springer 1997.

Kohl et al., "The Kerberos Network Authentication Service," RFC 1510, pp. 1-105, Internet Activities Board, Sep. 1993, retrieved on Jul. 10, 2001 from http://www.ietf.org/rfc/rfc1510.txt.

Law et al., "An Efficient Protocol for Authenticated Key Agreement," Technical Report CORR 98-05, pp. 1-16, Deparment of C&O, University of Waterloo, CAnada, Mar. 1998, revised Aug. 28, 1998.

Lim et al., "A Key Recovery Attack on Some Discrete Log-Based Schemes Using a Prime-Order Subgroup," Advances in Cryptology, Proceeding of the Crypto '97, vol. 1294 of Lecture Notes in Computer Science, pp. 249-263, Springer 1997.

Menezes et al., "Handbook of Applied Cryptography," Chapter 12 Key Establishment Protocols, Section 12.22 protocol Shamie's no-key protocol, p. 500, CRC Press, 1997.

M'Raihi, "Cost-Effective Payment Schemes with Privacy Regulation," Advances in Cryptology, Proceedings of ASIACRYPT '96, vol. 1163 of LNCS, pp. 266-275, 1996.

MacKenzie et al., "Secure Network Authentication with Password Identification," Submission to IEEE P1363 a working group, pp. 1-11, Jul. 30, 1999, retrieved Jul. 1, 2001 from http://www.manta.ieee.org/groups/:1363/studygroup/passwd.htm-1.

Monrose et al., "Password Hardening Based on Keystroke Dynamics," Proceedings of the 6.sup.th ACM Conference on Computer and Communications Security, pp. 73-82, Nov. 1-4, 1999, Singapore, retrieved Sep. 6, 2000 from http://www.acm.org/pubs/contents/proceedings/commsec/319709.

Perlman et al., "Secure Password-Based Protocol for Downloading a Private Key," Proceedings of the 1999 Network and Distributed System Security Symposium, Internet Society, Jan. 1999.

Pohlig et al., "An Improved Algorithm for Computing Logarithms Over GF(p) and Its Cryptographic Signigicance," IEEE Transactions on Information Theory, 24: 106-110, 1978.

Pointcheval et al., "Probably Secure Blind Signature Schemes," Advances in Cryptology, Proceedings of the ASIACRYPT '96, pp. 252-265, Kyongju, Korea, Nov. 1996, Springer 1996.

Rankl, "Handbuch der Chipkarten," HANSER_VERLAG, 2002, Munchen 050428, 203-210.

Rivest et al, "A Method for Obtaining Digitan Signatures and Public-Key Cryptosystems," Communications of the ACM, 21: 120-126, 1978.

"Skipjack and Kea Specifications," NIST, pp. 1-23, May 29, 1998 retrieved on Jul. 10, 2001 from http://csrc.nist.gov/encryption/skipjack-kea.htm.

Stadler et al., "Fair Bling Signatures," Advances in Cryptology, Proceedings of the EUROCRYPT '95, pp. 209-219, International Conference on the Theory and Application of Cryptographic Techniques, Saint-Malo, France, May 21-25, 1995, Springer 1995.

von Solms et al., "On Blind Signatures and Perfect Crimes," Computer and Security, 11: 581-583, 1992.

Wu, "The Secure Remote Password Protocol," Proceedings of the 1998 Network and Distributed System Security Symposium, pp. 1-15, Internet Society, Jan. 1998.

Zuccherato, "Methods for Avoiding the 'Small Subgroup' Attacks on the Diffie-Hellman Key Agreemnent for S/MIMI," IETF Internet-Draft, pp. 1-11, Jun. 1999, retrived on Aug. 29, 2001 from http://www.ietf.org/proceedings/99:ul/1-D/draft/ieft-smime-small0subgroup-ol.txt.

International Search Report for PCT/US2006/005606, mailed on Aug. 1, 2006.

\* cited by examiner

SECURE SEED PROVISIONING

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID® authentication token commercially available from RSA Security Inc. of Bedford, Mass., U.S.A. The RSA SecurID® authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA ACE/Server® software, available from RSA Security Inc. The PIN and current token code may be transmitted to the authentication entity via an encryption agent equipped with RSA ACE/Agent® software, also available from RSA Security Inc. If the PIN and current token code are determined to be valid, the user is granted access appropriate to his or her authorization level. Thus, the token codes are like temporary passwords that cannot be guessed by an attacker, with other than a negligible probability.

A given RSA SecurID® token typically contains one or more seeds that are utilized in computing the token outputs. The authentication entity performing the verification of the token outputs requires access to one or more seeds associated with the token in question. Typically, such authentication entities have access to the same seed or set of seeds that the token uses to generate its output.

SUMMARY OF THE INVENTION

A method is used for secure seed provisioning. Data is derived from inherent randomness in an authentication device. Based on the data, the authentication device is provisioned with a seed.

One or more implementations of the invention may provide one or more of the following advantages.

Seed provisioning of an authentication token or other device may be performed off site with sufficient security, control, and accountability, and, at least in some cases, without requiring a unique identification number to be built in.

These and other features and advantages of the present invention will become more readily apparent from the accompanying drawings and the following detailed description.

DETAILED DESCRIPTION

Described below is a technique for use in the configuration and seeding of security tokens (e.g., RSA SecurID® authentication tokens) at third party facilities, particularly at facilities of a configuration agent, such that a token can be configured without the configuration agent having security-defeating knowledge about the token. In particular, it is desirable to allow third parties to provision a token with a seed, but in such a way that the third party will not know, or be able to construct, the seed after the seed provisioning process is complete. As noted above, the seed may comprise, by way of example, a symmetric key or other secret shared by two or more entities.

In addition, it is desirable to make it difficult or impossible for the third party to create clones of a token. Two or more tokens are considered cloned if they generate the same series of pseudo-random numbers in the same order.

For example, the third party may be a contract manufacturer assembling tokens. Use of the technique described herein allows the contract manufacturer (after assembling the token) to provision the seed to the token such that the contract manufacturer does not know, and does not need to be responsible for, the resulting seed value of the token.

Figure 1:
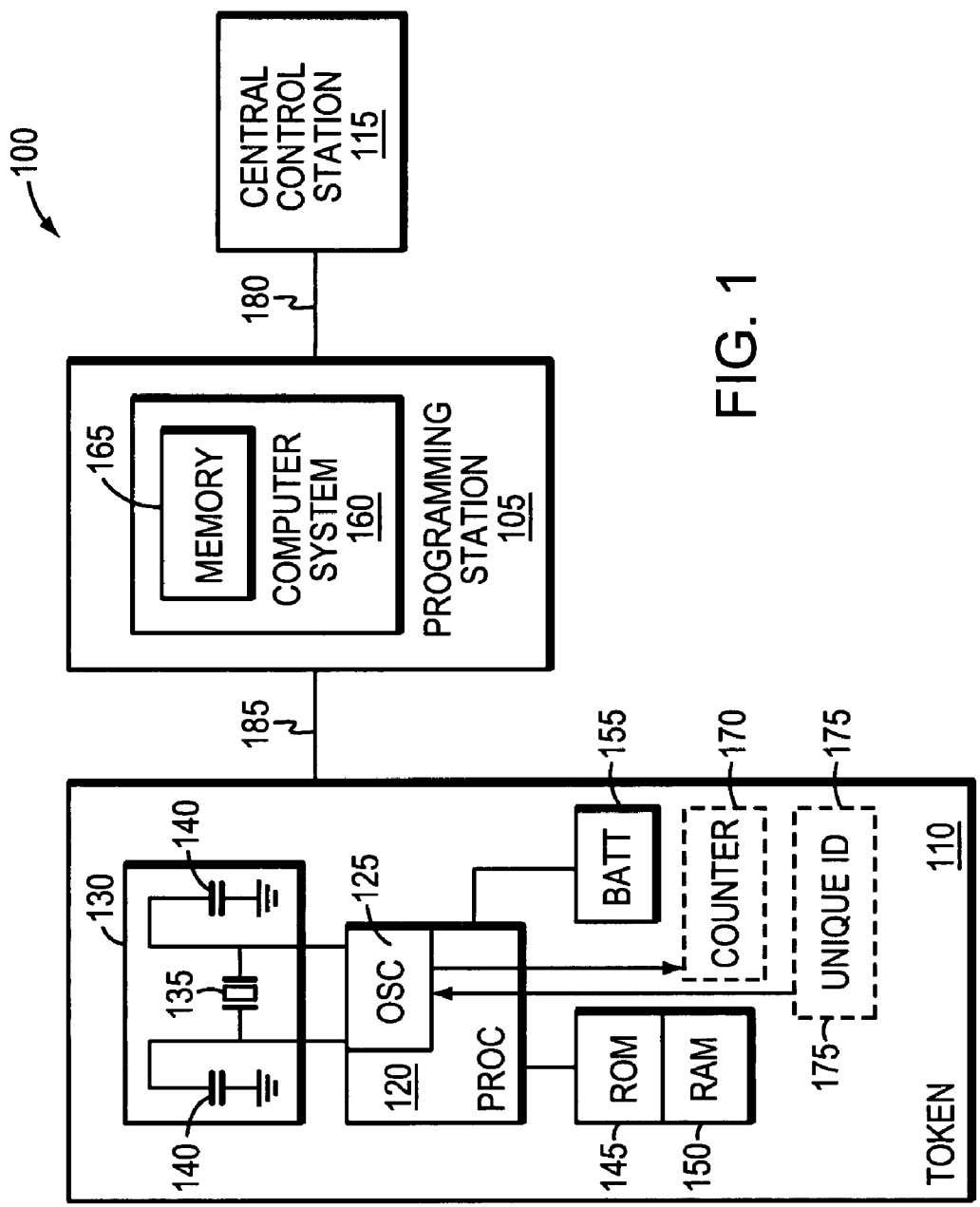
FIG. 1 is a block diagram of an example system for use with secure seed provisioning.
Figure 2:
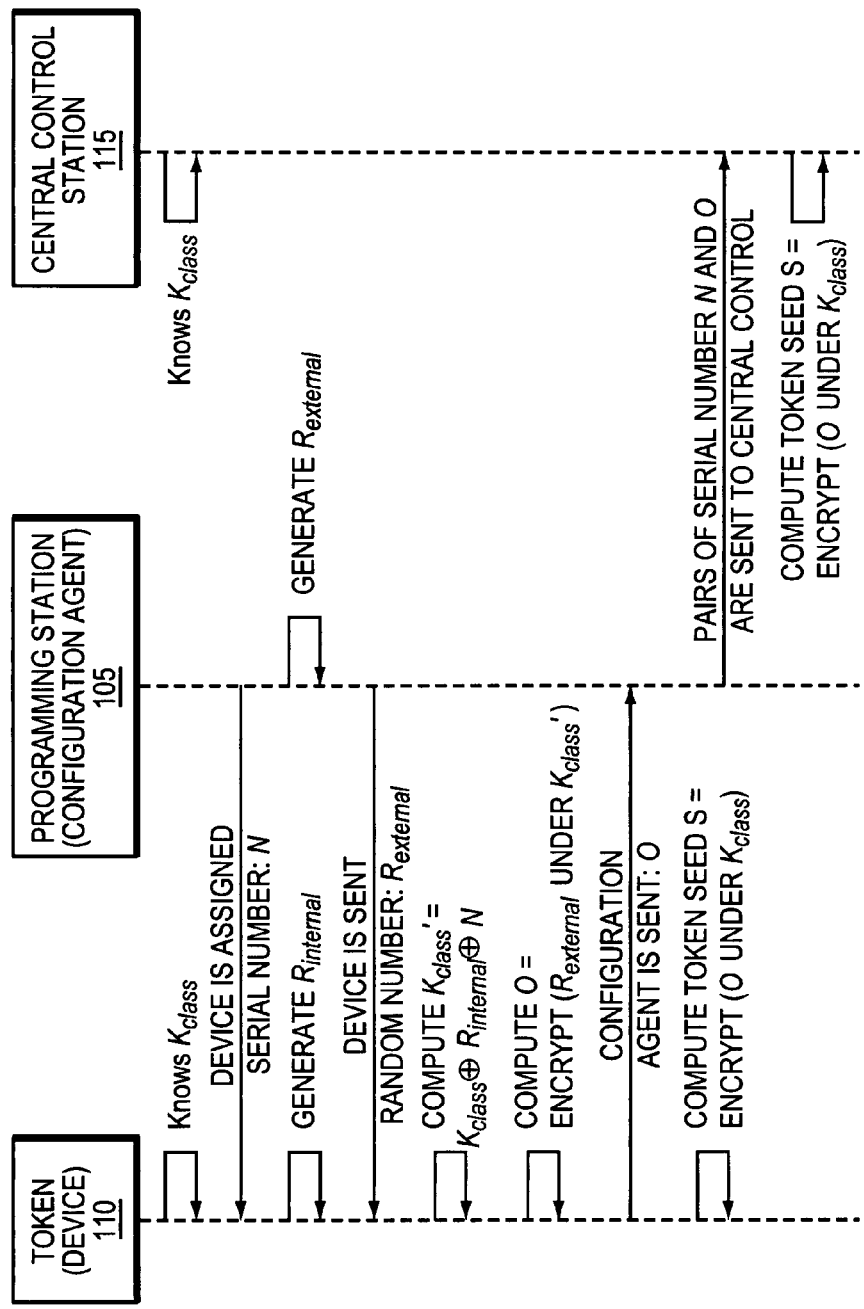
FIG. 2 is a flow diagram of a procedure for use with secure seed provisioning.

FIG. 1 illustrates an example of a system 100 for use with the technique. It is to be appreciated, however, that system 100 is merely an example implementation, and the invention is not restricted to use in this or any other particular system configuration.

FIG. 1 illustrates system 100 in which a robotic and/or manual programming station 105 communicates with a token (device) 110 and a central control (non third party) station 115 across respective communication links 185, 180. (The particular number of stations and tokens shown is by way of example only, and a given system in which the invention is implemented may include more or fewer than the particular number shown.) Each of the communication links 180, 185 may be or include one or more of the following: a global computer network such as the Internet, a wide area network (WAN), a local area network (LAN), a satellite network, a telephone or cable network, a wireless link such as 802.11 and/or Bluetooth, a USB based link, a serial or parallel link, a processor interface link, a memory interface link, or various portions or combinations of these and other types of links. In at least some implementations, one or more of links 180, 185 may rely on a secure connection established therein, in a conventional manner, through the SSL protocol.

In at least one specific implementation, there is a difference between links 185, 180: link 185 connects the programming station to the token, and may be a relatively simple link such as a proprietary bus, or a chip interface such as IIC or SPI; link 180 is between the programming station and the central control station, and may be use the Internet, a dialup link, or a physical media transfer such as a CD-ROM or tape.

Station 105 may be at and/or controlled by a configuration agent, and station 115 may be at and/or controlled by RSA Security Inc. or other central control. The programming station is responsible for helping to make the token ready for use, in particular by helping to program a seed into the token, and for communicating with the central control station as described below. The programming station may include and be controlled by a computer system 160 having a memory 165.

In the example implementation, token 110 includes a processor 120 having an oscillator section 125 driven by a crystal circuit 130 that includes a crystal 135 and capacitors 140. The processor has or is connected to read only memory (ROM) 145 containing firmware instructions for the processor, and has or is connected to read-write memory (RAM) 150. The processor is powered by a battery 155 (in other implementations, power may be supplied in addition or instead by another power source such as a USB port). Depending on the implementation as described below, the token may or may not have a counter 170 driven by the oscillator section, and/or a unique identification number such as processor's unique identifier 175. (In another example implementation, e.g., for an event-synchronous token, a simple RC (resistor-capacitor) driven oscillator may be adequate—and in some cases the oscillator is entirely internal to the microprocessor. All such examples still have variations in processor instruction timing due to tolerances and therefore can be used with the technique.)

With respect to the technique, it is assumed that a potential attacker can monitor the communications which occurs between the token and the programming station. In addition, it is assumed that the potential attacker is able to examine the contents of the memory in the computer system, if any, controlling the station.

It is assumed that firmware in the token has not been reverse engineered, and that security at the central control station's production environment has not been compromised.

In a first type of the technique, it is assumed that the token has no unique identification number available such as a processor identifier. Thus in particular it is assumed that every token has an identical processor which has no individual unique identifier. In at least some implementations each processor is identical in that the firmware instructions contained in the ROM (or other memory) of the processor are identical from unit to unit, and there are no unique identifiers stored in the memory of the processor. (It is also to be noted that in at least implementations some or all of the firmware instructions may be contained in other types or configurations of memory such as EEPROM, FLASH memory, or RAM, instead of or in addition to the ROM.)

Theoretically in at least some cases, if two tokens have processors that are identical, and configuration data is identical, the two tokens configured with the same data could be expected to generate identical pseudo random number streams.

In at least some implementations, the technique may rely on some uniqueness for each token based on at least one of the following sources of variability (i.e., inherent randomness):

1. The processor relies on the oscillator section which runs at a frequency which is determined by a number of electronic component based parameters including the characteristics and tolerances of the oscillator section's crystal, the characteristics and tolerances of the capacitors, and tolerances in the characteristics of internal gates of circuitry of the oscillator section. There may also be some other variables including the stray capacitance of a printed circuit board or other substrate on which token components are disposed.

2. There is non uniformity among tokens in powerup characteristics, e.g., the amount of time (latency) between when the token's battery is connected to the processor (e.g., is soldered onto a printed circuit board of the token), which essentially starts the oscillator section running, and when the token is configured.

3. The token's RAM reliably may power up with random data.

4. The token may have a built in random number generator.

In at least some implementations, the technique uses at least the first two sources of variability. In at least one example implementation, counter 170 is or includes a large counter, e.g., 32 bits wide, which is started as soon as the battery is connected to the processor (e.g., by soldering). This counter is incremented by a software (e.g., firmware instruction) loop having an execution speed that is controlled by the frequency of the oscillator section. The component-based parameters for each token cause the oscillator section, and therefore the loop, to operate at a rate which varies slightly from token to token.

When the token receives a configuration command, which is not synchronized with battery connection, the counter is stopped and sampled, which yields a counter value (which may be used as $R_{internal}$ discussed below). The combination of the slightly different oscillator frequency and the non uniformity in latency between battery connection and token configuration as described above yield counter values which vary with significant unpredictability from token to token.

In other implementations other ways may be used instead or as well to generate or help generate a unique counter value per token.

The unique counter value per token may be used to help provide the following features:

Two tokens programmed with the same configuration data end up with different seeds.

The third party performing the configuration of the token, who potentially can read all the data going into and coming out of the token, cannot determine the resulting seed from this data.

Central control can re-construct the seed so that a token seed record can be created.

The resulting seed maintains a high entropy.

In the example implementation, the first type of the technique can be used to help provide these features, by:

Using the counter $R_{internal}$, discussed above,

Using a key $K_{class}$, known by the token and by central control, but not known to the third party, and Injecting a high quality random number $R_{external}$ during configuration.

In the example implementation:

$R_{internal}$ is n-bits (e.g., 32 bits) of pseudo-random data generated by the device (e.g., in the form of the counter value described above, or based on the contents of RAM at powerup), $R_{external}$ is 128-bits of random data loaded from an external source of randomness, $K_{class}$ is 128-bit secret that is common to all tokens within a given class (e.g., a token type produced by a specific manufacturer), N is the serial number assigned to the token, O is an output of the token which can be used by central control to reconstruct the token's seed (e.g., master seed), and S is the token's seed.

With respect to the example implementation, the technique may by executed as follows.

1. The token internally generates $R_{internal}$.
2. $R_{external}$ is generated by the configuration agent.
3. $R_{external}$ is sent to the token from the configuration agent.

4. The configuration agent assigns serial number N to the token.

5. The token computes $K_{class}' = K_{class}$ XOR $R_{internal}$ (left aligned) XOR N (right aligned). (The data blocks for the values of $R_{internal}$ and N should be aligned such that the $R_{internal}$ data lines up with padding from N and vice versa, e.g., 2D E7 FF FF FF FF FF FF XOR FF FF FF FF FF FF 12 34.) ("XOR" denotes bit-wise addition modulo two.)

6. The token encrypts $R_{external}$ under key $K_{class}'$ to produce O

7. The token outputs O to the configuration agent

8. The token encrypts O under $K_{class}$ to produce seed S

9. The token stores seed S

10. The configuration agent sends pairs of serial numbers N and outputs O to central control.

11. Central control computes S from O and $K_{class}$

In at least some implementations, the following characteristics are provided and are important:

$R_{internal}$, $K_{class}$, $K_{class}'$, and S are all kept secret. (In at least some cases the technique assumes an attacker can see $R_{external}$, O, and N, but this is not enough for the attacker to compute S.)

If $R_{internal}$ is implemented as a counter value, it is not reset to zero when the token is reset. A specific example implementation operates as follows. The counter is stopped when the token receives a configure command, and the current counter value is used as $R_{internal}$. The counter remains stopped, but retains its current value until the token receives a reset command. Upon receiving a reset command, the token once again starts the counter, but starts counting from where it left off. When the next configure command comes in, the counter is once again stopped to read $R_{internal}$, but again the current value is kept in case the token is reset at some time in the future. Alternatively, it is possible to keep the counter running all the time, but in at least some implementations this arrangement would be impractical as it would quickly run down the battery.

The configuration agent knows only O and $R_{external}$.

O is unique to every device.

After configuration, the token retains the $R_{internal}$ value used by the technique. When the token is issued a reset command to prepare it to be re-configured, the token starts counting from where it left off, and then stop counting when a new configuration command is received. This helps prevent an attack in which the attacker issues a software reset command with the purpose of resetting $R_{internal}$ so that it can be stopped in a known state by the rapid issuance of a new configuration command after the software reset command.

In a second type of the technique, it is assumed that the token has a unique identification number available such as a processor identifier. The unique identification number may only be read internally by the processor that contains $K_{class}$ and processor instructions implementing the technique. The unique identification number makes each token fundamentally unique.

In at least one implementation, each processor starts off with a chip serial number as well as a unique value $U_{internal}$ programmed in at the time of chip fabrication by the semiconductor manufacturer. It is possible to use this unique value as the seed if there is a case in which it is deemed an acceptable risk that the processor manufacturer knows the mapping between the processor's chip serial number and the unique value. In cases in which using the unique value as the seed is unacceptably risky, an additional step involving a value generated at the third party location is needed. It is possible to use an implementation which does not require $K_{class}$, but including $K_{class}$ adds additional protection against a potential risk that the third party would collude with the chip manufacturer, and also makes the second type of the technique more consistent with the first type described above.

In the second type of the technique, the token uses unique value $U_{internal}$ instead of $R_{internal}$ to produce seed S, the semiconductor manufacturer provides central control with the mapping between the chip serial number and the unique value, and the third party provides central control with the mapping between the token serial number and $R_{external}$. Thus, only central control and the token have all the elements needed to produce seed S.

In at least some implementations, the following characteristics are provided and are important:

N, $U_{internal}$, $R_{external}$, and $K_{class}$ are required for the token to compute the seed S.

Pairs of chip serial numbers and $U_{internal}$ are known only to the semiconductor manufacturer and central control.

Pairs of token serial numbers and $R_{external}$ are known only to the configuration agent and central control.

The semiconductor manufacturer knows only chip serial numbers and $U_{internal}$.

The configuration agent knows only $U_{internal}$ and $R_{external}$.

In at least some implementations, the entropy source for the generation of R.sub.external must be unpredictable and hardware based, a minimum of 128 bits of entropy are required for each value of R.sub.external, and the random number generator (RNG) must have passed the Diehard tests for randomness as referenced in Marsaglia, G., 1995, Diehard Battery of Tests of Randomness. See also Rukhin, A., Soto, J., Nechvatal, J., et al, 2001, A Statistical Test Suite for Random and Pseudorandom Number Generators for Cryptographic Applications, NIST Special Publication 800-22.

Although reference is made herein to random numbers, it is to be appreciated that the invention can be implemented using pseudorandom numbers or other types of strings of sufficient entropy.

The term device or computer as used herein refers generally to any processor-based equipment or system capable of implementing at least a portion of the technique as described herein.

One or more of token 110 and stations 105, 115 may be, be included in, or include, by way of example and without limitation, a computer, a mobile telephone, a personal digital assistant (PDA), a smart card, an authentication token, a server, and/or various portions or combinations of these and other processing devices. One or more of token 110 and stations 105, 115 may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

Station 105 may communicate with token 110 and/or station 115 directly over respective links 185 and/or 180, or may communicate via one or more intermediary processing devices. For example, if the token comprises an authentication token, it may communicate with station 105 over link 185 using an intermediary device such a desktop or portable personal computer, mobile telephone or PDA. Such intermediary devices are not specifically shown in FIG. 1, but token 110 may be viewed as comprising, for example, a combination of an authentication token and an associated computer or other intermediary device. Similarly, one or more of stations 105, 115 may incorporate or communicate through one or more intermediary processing devices. As indicated above, the term "processing device" as used herein is intended to encompass such combinations of devices.

Details regarding certain conventional cryptographic techniques suitable for use in conjunction with the present invention may be found in, e.g., A. J. Menezes et al., Handbook of Applied Cryptography, CRC Press, 1997, which is incorporated by reference herein.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for use in secure seed provisioning, the method comprising the steps of:
   deriving, by an authentication device, data from an inherent source of randomness in the authentication device;
   based on the data, provisioning, by the authentication device, the authentication device with a seed;
   preventing, by the authentication device, direct external exposure of the seed during the lifetime of the authentication device; and
   receiving, by the authentication device and from a programming station, a configuration command to provision the authentication device with the seed, the authentication device being provisioned with the seed in response to the configuration command;
   wherein deriving the data from an inherent source of randomness in the authentication device includes:
      generating, by a processor of the authentication device, the data based on a counter value which represents an amount of time between (i) when a battery of the authentication device is connected to the processor and (ii) when the configuration command is received from the programming station.

2. The method of claim 1, wherein the seed comprises a symmetric key.

3. The method of claim 1, wherein the inherent source of randomness is based on a powerup characteristic of the authentication device.

4. The method of claim 1, wherein the inherent source of randomness is based on an electronic component characteristic of the authentication device.

5. The method of claim 1, wherein the inherent source of randomness is based on an amount of time between unsynchronized events in the authentication device.

6. The method of claim 1, further comprising:
   starting to increment a counter when power is applied to the authentication device,
   wherein the data is based on a value of the counter.

7. The method of claim 1, further comprising:
   further deriving the data from a source of randomness external to the authentication device.

8. The method of claim 1, further comprising:
   outputting an intermediate level value to a recipient, the intermediate level value being required for the recipient to calculate the seed.

9. The method of claim 1, further comprising:
   deriving a value from the inherent source of randomness; and
   outputting the value to a recipient, the value being required for the recipient to calculate the seed.

10. The method of claim 1, further comprising:
    outputting a first value to a first recipient, the first value alone being insufficient to allow calculation of the seed; and
    at the first recipient, calculating the seed from the first value and a second value already available to the first recipient, the second value being unavailable to a second recipient.

11. The method of claim 1, further comprising:
    deriving the seed from a unique value provided in the authentication device.

12. The method of claim 1, further comprising:
    using the inherent source of randomness to affect a value of a counter in the authentication device.

13. The method of claim 1, further comprising:
    avoiding resetting the value of a counter in the authentication device to zero when the authentication device is reset.

14. The method of claim 1, further comprising:
    deriving the seed from a source of randomness that is external to the authentication device, the source of randomness being unpredictable and hardware based.

15. The method of claim 1, further comprising:
    deriving the seed using encryption.

16. The method of claim 1, further comprising:
    deriving the seed from a unique value programmed into the authentication device at the time of chip fabrication.

17. The method of claim 1, further comprising:
    controlling access to values such that only one or more authorized entities outside the authentication device have sufficient information to calculate the seed.

18. The method of claim 1, further comprising:
    deriving the seed based on a mapping between a chip serial number and a unique value programmed into the authentication device at the time of chip fabrication.

19. The method of claim 1, further comprising:
    deriving the seed based on a mapping between a serial number of the authentication device and a value based on an external source of randomness.

20. A method for use in secure seed provisioning, the method comprising the steps of:
    deriving, by a first authentication device, data from a secret number embedded in multiple authentication devices including the first authentication device, and from a unique number embedded in the first authentication device only;
    based on the data, provisioning, by the first authentication device, the first authentication device with a seed;
    preventing, by the first authentication device, direct external exposure of the seed from the first authentication device during the lifetime of the first authentication device; and
    receiving, by the first authentication device and from a programming station, a configuration command to provision the first authentication device with the seed, the authentication device being provisioned with the seed in response to the configuration command;

wherein deriving the data from the secret number embedded in the multiple authentication devices and from a unique number embedded in the first authentication device only includes:

generating, by a processor of the first authentication device, the data based on a counter value which represents an amount of time between (i) when a battery of the first authentication device is connected to the processor and (ii) when the configuration command is received from the programming station.

21. A method for use in secure seed provisioning, the method comprising the steps of:

deriving, by an authentication device, a first number from an internal source of randomness;

receiving, by the authentication device, a second number based on an external source of randomness;

receiving, by the authentication device, a serial number;

internally retrieving, by the authentication device, a non-unique secret key;

deriving, by the authentication device, a third number from the first number, serial number, and the non-unique secret key;

externally exposing the third number while preventing direct external exposure of the seed from the authentication device during the lifetime of the authentication device; and deriving a key from the second and third numbers;

wherein deriving the first number from the internal source of randomness includes:

generating, by a processor of the authentication device, the first number based on a counter value which represents an amount of time between (i) when a battery of the authentication device is connected to the processor and (ii) when the second number is received.

22. The method of claim 21, wherein the authentication device includes a random number generator; and wherein generating the data includes:

providing the data based on both the counter value and a random number supplied by the random number generator, the counter value and the random number being different from each other, the programming station being prevented from ever reading the seed provisioned to the authentication device which is based on the data based on both the counter value and the random number.

* * * * *